(12) United States Patent
Bea et al.

(10) Patent No.: US 10,603,745 B2
(45) Date of Patent: Mar. 31, 2020

(54) CUTTING GAS NOZZLE AND LASER CUTTING METHOD HAVING A DISPLACEABLE SLEEVE FOR SETTING THE FLOW CHARACTERISTICS

(71) Applicant: TRUMPF Werkzeugmaschinen GmbH + Co. KG, Ditzingen (DE)

(72) Inventors: Martin Bea, Gerlingen (DE); Tim Hesse, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 15/794,634

(22) Filed: Oct. 26, 2017

(65) Prior Publication Data
US 2018/0056444 A1 Mar. 1, 2018

Related U.S. Application Data

(63) Continuation of application No. PCT/EP2016/059158, filed on Apr. 25, 2016.

(30) Foreign Application Priority Data

May 4, 2015 (DE) .................. 10 2015 208 157

(51) Int. Cl.
*B23K 26/08* (2014.01)
*B23K 26/14* (2014.01)
(Continued)

(52) U.S. Cl.
CPC ........ *B23K 26/0876* (2013.01); *B23K 26/048* (2013.01); *B23K 26/1437* (2015.10);
(Continued)

(58) Field of Classification Search
CPC ............ B23K 26/0876; B23K 26/1437; B23K 26/1488; B23K 26/38; B23K 26/1476;
(Continued)

(56) References Cited

U.S. PATENT DOCUMENTS

| 4,002,877 | A | | 1/1977 | Banas |
| 4,031,351 | A | * | 6/1977 | Martin .................. B23K 26/12 |
| | | | | 219/121.67 |

(Continued)

FOREIGN PATENT DOCUMENTS

| CN | 1 234 497 | 11/1999 |
| CN | 1450945 | 10/2003 |

(Continued)

OTHER PUBLICATIONS

International Preliminary Report on Patentability and Written Opinion of the International Search Authority for International Application No. PCT/EP2016/059158 dated Nov. 16, 2017 (8 pages).

(Continued)

*Primary Examiner* — Tu B Hoang
*Assistant Examiner* — Alba T Rosario-Aponte
(74) *Attorney, Agent, or Firm* — Fish & Richardson P.C.

(57) ABSTRACT

This disclosure describes laser machining head cutting gas nozzles that include an inner nozzle having a nozzle opening configured to form a core gas flow, an outer nozzle having an annular gap surrounding the nozzle opening and configured to form an annular gas flow, and a sleeve in the annular gap, wherein the sleeve is arranged to be axially displaceable between a rearward position and a forward position, wherein the sleeve projects beyond the inner nozzle at least when in the forward position, and wherein the sleeve widens a cross-sectional area of the outer nozzle to a variable degree as the sleeve is displaced from the rearward to the forward position. Methods of using a cutting gas nozzle are also described.

10 Claims, 5 Drawing Sheets

(51) Int. Cl.
  *B23K 26/38* (2014.01)
  *B23K 26/382* (2014.01)
  *B23K 26/04* (2014.01)
  *B23K 26/21* (2014.01)
  *B23K 26/70* (2014.01)

(52) U.S. Cl.
  CPC .......... *B23K 26/1488* (2013.01); *B23K 26/38* (2013.01); *B23K 26/389* (2015.10); *B23K 26/21* (2015.10); *B23K 26/70* (2015.10)

(58) Field of Classification Search
  CPC .. B23K 26/1464; B23K 26/1462; B05B 1/12; B05B 1/34; B05B 1/3402
  USPC ..... 219/121.67, 121.6, 121.72; 239/456, 451
  See application file for complete search history.

(56) References Cited

U.S. PATENT DOCUMENTS

| | | | |
|---|---|---|---|
| 4,227,582 | A | 10/1980 | Price |
| 4,324,972 | A | 4/1982 | Furrer et al. |
| 4,458,133 | A | 7/1984 | Macken |
| 5,424,508 | A | 6/1995 | Swain et al. |
| 5,481,083 | A | 1/1996 | Smyth, Jr. |
| 5,609,781 | A | 3/1997 | Kaga et al. |
| 5,753,881 | A | 5/1998 | Watanabe |
| 5,814,786 | A | 9/1998 | Johnson et al. |
| 5,926,967 | A | 7/1999 | Johnson et al. |
| 5,932,117 | A | 8/1999 | Johnson et al. |
| 5,951,889 | A | 9/1999 | Johnson et al. |
| 6,070,781 | A | 6/2000 | Johnson et al. |
| 6,118,097 | A | 9/2000 | Kaga et al. |
| 6,288,363 | B1 | 9/2001 | Kaga et al. |
| 6,797,917 | B1 | 9/2004 | Yamaoku et al. |
| 7,838,796 | B2 | 11/2010 | Furui |
| 9,604,310 | B2 | 3/2017 | Jouanneau et al. |
| 9,610,652 | B2 | 4/2017 | Jouanneau et al. |
| 9,616,525 | B2 | 4/2017 | Jouanneau et al. |
| 9,844,832 | B2 | 12/2017 | Jouanneau et al. |
| 10,076,806 | B2 | 9/2018 | Debecker et al. |
| 2006/0113286 | A1 | 6/2006 | Furui |
| 2009/0294048 | A1 | 12/2009 | Matsuo |
| 2014/0069898 | A1 | 3/2014 | Debecker et al. |
| 2015/0048069 | A1 | 2/2015 | Debecker et al. |
| 2015/0151378 | A1 | 6/2015 | Fujii et al. |
| 2015/0273628 | A1* | 10/2015 | Jouanneau .......... B23K 26/048 219/121.73 |
| 2015/0290742 | A1* | 10/2015 | Jouanneau .......... B23K 26/048 219/121.73 |
| 2015/0336210 | A1 | 11/2015 | Jouanneau et al. |
| 2017/0182589 | A1 | 6/2017 | Jouanneau et al. |
| 2017/0189993 | A1 | 7/2017 | Lefebvfre |
| 2018/0354071 | A1 | 12/2018 | Debecker et al. |
| 2018/0354073 | A1 | 12/2018 | Debecker et al. |

FOREIGN PATENT DOCUMENTS

| | | | |
|---|---|---|---|
| CN | 101497493 | 8/2009 | |
| CN | 102513703 | 6/2012 | |
| CN | 102554461 | 7/2012 | |
| CN | 202291850 | 7/2012 | |
| CN | 103962726 | 8/2014 | |
| DE | 134198 Z | 2/1979 | ............ B21D 45/02 |
| DE | 32 22 394 | 12/1983 | ............ B23K 26/08 |
| DE | 198 53 735 | 3/2000 | ............ B23K 26/04 |
| DE | 19853735 C1 | 3/2000 | |
| DE | 10041276 A1 | 3/2002 | |
| DE | 101 60 785 | 8/2003 | ............ B23K 26/14 |
| DE | 10 2012 208 731 | 11/2013 | |
| EP | 0 061 352 | 12/1984 | ............ B23K 26/00 |
| EP | 1 354 663 | 10/2003 | ............ B23K 26/14 |
| EP | 1 669 159 | 6/2006 | ............ B23K 26/38 |
| EP | 1669159 A1 | 6/2006 | |
| EP | 1 920 905 | 5/2008 | ............ B29C 65/16 |
| FR | 2 923 168 | 5/2009 | ............ B23K 26/14 |
| FR | 2 997 883 | 5/2014 | |
| GB | 1 365 673 | 9/1974 | ............... B26F 3/14 |
| JP | S 57190795 | 11/1982 | |
| JP | 61037393 | 2/1986 | ............ B23K 26/04 |
| JP | 62006790 | 1/1987 | ............ B23K 26/14 |
| JP | 62-251017 | 10/1987 | ............... B23H 7/02 |
| JP | 63-40695 | 2/1988 | ............ B23K 26/14 |
| JP | H 1-271086 | 10/1989 | ............ B23K 26/04 |
| JP | H 055280 | 1/1993 | |
| JP | H 05-013683 | 2/1993 | |
| JP | H 06-039571 | 2/1994 | |
| JP | 6063784 | 3/1994 | ............ B21B 27/00 |
| JP | 7251287 | 10/1995 | ............ B23K 26/06 |
| JP | H 07-251287 | 10/1995 | |
| JP | 10216978 | 8/1998 | ............ B23K 26/06 |
| JP | 10216978 A | 8/1998 | |
| JP | 10286686 A | 10/1998 | |
| JP | 11277271 | 10/1999 | |
| JP | 2004191204 | 7/2004 | |
| JP | 2005-118849 | 5/2005 | ............ B23K 26/14 |
| JP | 2012030249 A | 2/2012 | |
| JP | 2012-130969 | 7/2012 | |
| JP | 2015-534904 | 12/2015 | |
| JP | 6066881 | 1/2017 | ............ G06Q 40/04 |
| RU | 1 787 321 | 7/1994 | ............ B23K 26/14 |
| WO | WO 2014/072611 | 5/2014 | |
| WO | WO2014072609 A1 | 5/2014 | |
| WO | WO 2014072609 A1 * | 5/2014 | ........... B23K 26/048 |

OTHER PUBLICATIONS

Korean Office Action in Application No. 10-2017-7025838, dated Jan. 2, 2018, 14 pages (with English translation).
Korean Office Action in Application No. 10-2017-7025838, dated Dec. 19, 2017, 14 pages (with English translation).
International Search Report for PCT Application No. PCT/EP2016/059158, dated Jun. 30, 2016, 6 pages.
Chinese Office Action in Application No. 201680005927.1, dated Mar. 28, 2018, 8 pages (with English translation).
Chinese Office Action in Application No. 201680005927.7, dated Mar. 28, 2018, 8 pages (with English translation).

* cited by examiner

CUTTING GAS NOZZLE AND LASER CUTTING METHOD HAVING A DISPLACEABLE SLEEVE FOR SETTING THE FLOW CHARACTERISTICS

CROSS-REFERENCE TO RELATED APPLICATIONS

This application is a continuation of and claims priority under 35 U.S.C. § 120 to PCT Application No. PCT/EP2016/059158 filed on Apr. 25, 2016, which claims priority to German Application No. 10 2015 208 157.5, filed on May 4, 2015. The entire contents of these priority applications are incorporated herein by reference.

TECHNICAL FIELD

The invention relates to a cutting gas nozzle for a laser machining head, and also to a method for laser cutting a workpiece with a gas-pressurized cutting gas nozzle.

BACKGROUND

Cutting gas nozzles are known, for example, from JPH 10 216978A or from DE 198 53 735 C1. Cutting gas nozzles can be employed on a laser machine tool such as is disclosed in DE 10 2013 210 844 B3, for example.

Different cutting gas nozzles that have different external or internal contours, different shaped nozzle openings, and different nozzle diameters are required for cutting different materials (e.g., construction steel, stainless steel, aluminum, etc.) in different material thicknesses with the aid of a laser beam. To accommodate this diversity while reducing the frequency of necessary nozzle changes, a cutting gas nozzle for a laser machining head that directs a cutting gas through an inner nozzle onto the processing location and directs an auxiliary gas through an annular gap nozzle that surrounds the inner nozzle onto the processing location is known from JPH 10 216978A. The annular gap nozzle with the aid of a screw thread can be axially advanced and reversed relative to the inner nozzle to change the nozzle opening (the nozzle cross-sectional area) of the annular gap nozzle and to thus influence the gas flow of the auxiliary gas.

A laser machining head in which a cutting gas nozzle having an inner nozzle and having an annular gap nozzle is disposed in a hollow piston that is guided in a displaceable manner is known from DE 198 53 735 C1. In the operation of the laser machining head, a gas cushion is formed between the workpiece surface and the end face of the hollow piston. The gap dimension between the workpiece surface and the end face of the hollow piston can be adjusted with the aid of the gas pressure, wherein the inner nozzle and the annular gap nozzle can be pressurized with different pressures.

SUMMARY

The present disclosure refines cutting gas nozzles in such a manner that the flow conditions of the core flow and the annular flow can be changed or regulated during the cutting process without having to change the gas pressure, and discloses methods for laser cutting with such cutting gas nozzles.

In some embodiments, a sleeve is guided in an annular gap of an outer nozzle so as to be axially displaceable between a rearward position and a forward position, with the sleeve at least in the forward position projecting beyond the inner nozzle and opening the nozzle cross-sectional area of the outer nozzle to a variable degree. In one (rearward or forward) position thereof, the sleeve largely or completely closes the outer nozzle, and in the other (forward or rearward) position thereof, opens the outer nozzle.

By displacing the sleeve within the annular gap, the properties of the cutting gas nozzle in terms of the flow mechanics can be varied from the characteristic of a single-bore nozzle (single-duct nozzle), in which the cutting gas flows out from only the inner nozzle, to that of a bypass flow nozzle (multi-duct nozzle), in which the cutting gas flows out from both the inner nozzle as well as from the outer nozzle. The single-bore nozzle is advantageous for processing thin sheets and for piercing, while the bypass flow nozzle is advantageous for processing of thick sheets. Workpieces of different thickness can thus be cut using the same cutting gas nozzle, and different machining methods can also be implemented. The flexibility of the cutting gas nozzles described herein reduces the number of hitherto necessary cutting nozzles as well as the spare parts inventory. Furthermore, unproductive downtimes of the machine during a nozzle change can be minimized.

The inner nozzle and the outer nozzle are formed in a nozzle body and can either have mutually separate gas connectors or a common gas connector if a nozzle bore of the inner nozzle and the annular gap of the outer nozzle are interconnected by way of at least one connection bore of the nozzle body. In the latter case, the nozzle bore of the inner nozzle is advantageously connected to the gas connector, and the annular gap is connected to the nozzle bore by way of the connection bore(s).

In the rearward position of the sleeve, an annular space connected to the environment by way of a guide gap between the nozzle body and the sleeve remains between the rear end face of the sleeve and the nozzle body. At least one connection opening is formed as an opening that extends into the annular space. Due to the annular space that is provided in each sleeve position and of the opening(s) communicating therewith, it is possible for the sleeve to be suctioned from an advanced position to the rearward end position of the sleeve by way of a targeted selection of the gas pressure.

In other embodiments, the nozzle bore of the inner nozzle and the annular gap of the outer nozzle are not interconnected by openings. An annular space that is provided between the rear end face of the sleeve and the nozzle body is connected to the environment by way of a guide gap between the nozzle body and the sleeve. Due to the Venturi effect of the cutting gas that flows out of the internal valve, air (oxygen) is suctioned from the environment, and the air within the sleeve mixes with the nitrogen cutting gas jet.

The contact pressure of the sleeve on the workpiece surface can advantageously be adjusted in a targeted manner by the constructive design of the sleeve. If the surface part of the sleeve on which the cutting gas pressure acts in a forward direction is larger than the surface part of the sleeve on which the cutting gas pressure acts in a reverse direction, in particular in the case of a sleeve that has landed on the workpiece surface, the cutting gas pressure causes a contact-pressure force of the sleeve on the workpiece surface.

Alternatively, the surface part of the sleeve on which the cutting gas pressure acts in the forward direction can be equal to or somewhat smaller than the surface part of the sleeve on which the cutting gas pressure acts in the reverse direction (in the case of a sleeve that has landed on the workpiece surface). In this case, independent of the absolute level of gas pressure, the lifting force and the contact-pressure force that act on the sleeve by way of the cutting gas pressure are at equilibrium, or a small lifting force is established. The sleeve can slide across a planar workpiece surface with minimal friction, but nevertheless constantly bearing in planar manner on the workpiece surface.

Alternatively, a minimum gap is established between the end face of the sleeve and the workpiece surface such that the sleeve hovers above the workpiece surface. The latter design embodiment of the sleeve is particularly advantageous for scratch-free machining by cutting.

Particularly advantageously, the internal wall of the annular gap is formed by the conical external side of the inner nozzle. Further advantageously, the sleeve is guided so as to be displaceable on the external wall of the annular gap.

In some embodiments, the sleeve in one of the (end) positions thereof closes the outer nozzle, and a valve seat on which the sleeve in that position thereof that closes the outer nozzle bears is disposed in the annular gap.

In some instances, the valve seat is closed in the rearward (end) position of the sleeve, and is open in the forward (end) position of the sleeve. The valve seat can be formed by a conical wall portion or by an annular shoulder of the annular gap, for example. The valve seat is disposed on the internal wall of the annular gap, but in the case of the annular shoulder can also be formed on the base of the annular gap. The conical wall portion tapers in the forward direction of the sleeve.

In other embodiments, the valve seat is closed in the forward (end) position of the sleeve, and is open in the rearward (end) position of the sleeve. The valve seat can be formed by a conical wall portion or by an annular shoulder of the annular gap, for example, wherein the sleeve has a sealing face that in the reverse direction engages behind the valve seat. The conical wall portion tapers in the reverse direction of the sleeve.

A sealing face of the sleeve that interacts with the valve seat can be molded to the sleeve in an integral manner or be formed by a separate annular seal. In the latter case, the sleeve and the annular seal can be made from different materials; for example, a sleeve made of ceramic and an annular seal made of metal. The production costs for the sleeve are reduced and the annular seal has a more precise sealing face than an integral sleeve made from ceramics.

In some embodiments, the sleeve is mounted in the annular gap in a "floating" manner to have a lateral clearance such that the sleeve is mounted to be tiltable, for example, by ±5°, within the annular gap. In this way, the cutting gas nozzle is able to react to uneven workpiece surfaces by tilting without being mechanically damaged or losing the form-fitting contact to a planar, but slightly tilted, sheet surface. The sleeve can advantageously have an externally encircling pointed or spherical centering bead, which is guided to be displaceable and mounted to be tiltable on the external wall of the annular gap. Alternatively or additionally, the external wall of the annular gap can taper, e.g., in a conical manner, in the forward direction, and/or the sleeve external side can taper, e.g., in a conical manner, in the reverse direction, to enable tilting of the sleeve by approximately ±5° within the annular gap.

To slide without damage across minor steps in the workpiece surface, such as can arise by the tilting of workpiece parts that have been cut off, for example, the front end face of the sleeve typically has a run-up slant. This run-up slant, for example, can be in the form of a 45° chamfer on the internal and/or external side.

In certain embodiments, the sleeve is made from ceramics (aluminum oxide, for example) since ceramics in terms of high-frequency technology are sufficiently neutral or electrically non-conducting, respectively. The cutting gas nozzles described herein can be treated like a common bypass flow nozzle (a nozzle without an integrated sleeve) by the capacitive spacing sensor system of the laser machining head. Furthermore, the high melting point and the high resistance to abrasion of ceramics guarantee a sufficiently long service life of the sleeve. However, instead of ceramic, the sleeve can also be formed from a comparably temperature-resistant and electrically non-conducting material or from a plastic material that is temperature resistant up to at least 100° C. In the latter case, the sliding properties, the strength, and a temperature resistance (continuous operating temperature) up to at least 100° C. are important. The coefficient of friction in the movement across dry steel should be <0.3. Moreover, the relative dielectric constant at 106 Hz should be below 3. These requirements are met by TEFLON® (polytetrafluoroethylene), for example.

The front end face of the sleeve typically has at least one groove (e.g., a plurality of grooves) that runs obliquely to the radial direction, or the sleeve wall can have at least one bore (e.g., a plurality of bores), that runs obliquely to the radial direction. Due to the oblique or helical alignment, respectively, of the grooves and bores, the momentum of the outflowing cutting gas exerts a torque and rotates the sleeve. Alternatively, the external side of the sleeve wall can also have at least one groove (e.g., a plurality of grooves), that runs obliquely to the axial direction such that the sleeve is set in rotation by the air that flows axially along the outside of the sleeve or by the process or inert gas that flows along the outside of the sleeve. Due to the rotating sleeve, contaminants on the workpiece surface can be removed, for example. The gas pressure within the processing zone that is located below the sleeve can be modulated in a targeted manner by way of at least one bore or groove (e.g., a plurality of bores or grooves) in the sleeve wall.

The cutting gas nozzles described herein can advantageously be utilized, for example, for high-pressure nitrogen laser cutting of multi-layer sheet stacks (e.g., thin sheets, e.g., made of construction steel, stainless steel, or aluminum). The air cushion that is formed within the sleeve causes a contact-pressure force on the workpiece stack that prevents fanning out of the individual workpieces during the cutting process. The gas cushion under the sleeve exerts a contact-pressure force on the sheet stack that acts in a planar manner such that no moments act on the sheet surface in the region of the laser beam (as opposed to contact-pressure forces that are applied in a locally delimited manner due to gas jets that are tightly delimited in a spatial manner), and such that no locally delimited sinking results in combination with bulging of the individual sheets. Neither cutting gas nor molten mass can thus penetrate the intermediate spaces between the individual stacked workpieces. The individual cutting edges that are stacked in a gap-free manner in this instance act on the cutting gas jet like one common homogeneous cutting edge such that a uniformly high burr-free cutting-edge quality can be achieved across all stacked workpieces. Due to the improved introduction of the cutting gas into the cutting gap as caused by the sleeve, cutting can be carried out at cutting gas pressures that are reduced by a factor of 3 to 5 as compared to standard cutting gas nozzles. The static gas pressure in the cutting gap that can lead to individual workpieces of the stack diverging is therefore likewise lower by a factor of 3 to 5 as compared to the use of conventional nozzles such that the likelihood of any fanning out of the sheet stack due to the cutting gas pressure in the cutting gap is reduced.

The disclosure also relates to a method for laser cutting a workpiece with a gas-pressurized cutting gas nozzle as described above, wherein a laser beam is directed through the inner nozzle onto the workpiece, and wherein the sleeve is displaced to an operating position mechanically by contact with the workpiece surface or pneumatically. In some embodiments, the sleeve is advanced in a forward direction by the cutting gas pressure, and is reversed by the cutting gas nozzle being lowered in a variable manner onto the workpiece.

The reversing of the sleeve toward the rear (that is to say into the nozzle body) is caused by contact between the front end face of the sleeve and the workpiece surface. Due to a vertical movement of the cutting gas nozzle or of the laser machining head that carries the cutting gas nozzle, respectively, in the direction toward the workpiece surface, the sleeve is urged onto the workpiece and in this way is pushed backward within the annular gap. A ratio between the core flow through the inner nozzle and the sheath flow through the annular gap results, the ratio being controllable by way of the spacing of the laser machining head (and thus of the cutting gas nozzle) from the workpiece surface.

The properties of the cutting gas nozzle in terms of the flow mechanics by way of the vertical spacing of the laser machining head from the workpiece surface can thus be varied in a numerically controlled manner, for example when changing from piercing to cutting, or else during the ongoing cutting process, between the characteristic of a single-duct nozzle to that of a multi-duct nozzle. When the sleeve has landed on the workpiece surface, the sleeve can slide on the workpiece surface, and a cavity that is closed to be (almost) gas-tight, and additionally improves coupling-in of the cutting gas into the cutting gap formed between the sleeve and the workpiece surface. A lateral outflow of the cutting gas across the sheet surface is prevented, and the cutting gas consumption is reduced.

The sleeve is advanced forwards in a pressure-controlled manner with the aid of the cutting gas that acts on the sleeve. For example, if the rear end face of the sleeve is designed to be significantly larger than the front end face of the sleeve, the ratio of the pressure forces of the cutting gas that act on the front end face or on the rear end face, respectively, of the sleeve causes a resulting force toward the front and a contact-pressure force on the workpiece if the sleeve has landed on the workpiece surface.

In other embodiments, a cutting gas nozzle has at least one connection opening that communicates with an annular duct between the nozzle body and the rear end face of the sleeve. The sleeve is advanced in a forward direction when the cutting gas pressure is above a limit value, and is retracted in a reverse direction when the cutting gas pressure is below the limit value.

In some embodiments of the cutting gas nozzles, the nozzle bore of the inner nozzle and the annular gap of the outer nozzle are not interconnected. In the case of an opened nozzle cross-sectional area of the outer nozzle, ambient air is suctioned from the core flow into the annular space and then exits the cutting gas nozzle conjointly with the core flow.

Further advantages and advantageous design embodiments of the subject matter of the invention are derived from the description, the claims, and the drawings. The features mentioned herein can likewise be used individually or as a plurality in any combination with one another. The embodiments shown and described are not an exhaustive enumeration, but rather are exemplary for illustrating the invention.

Figure 1A:
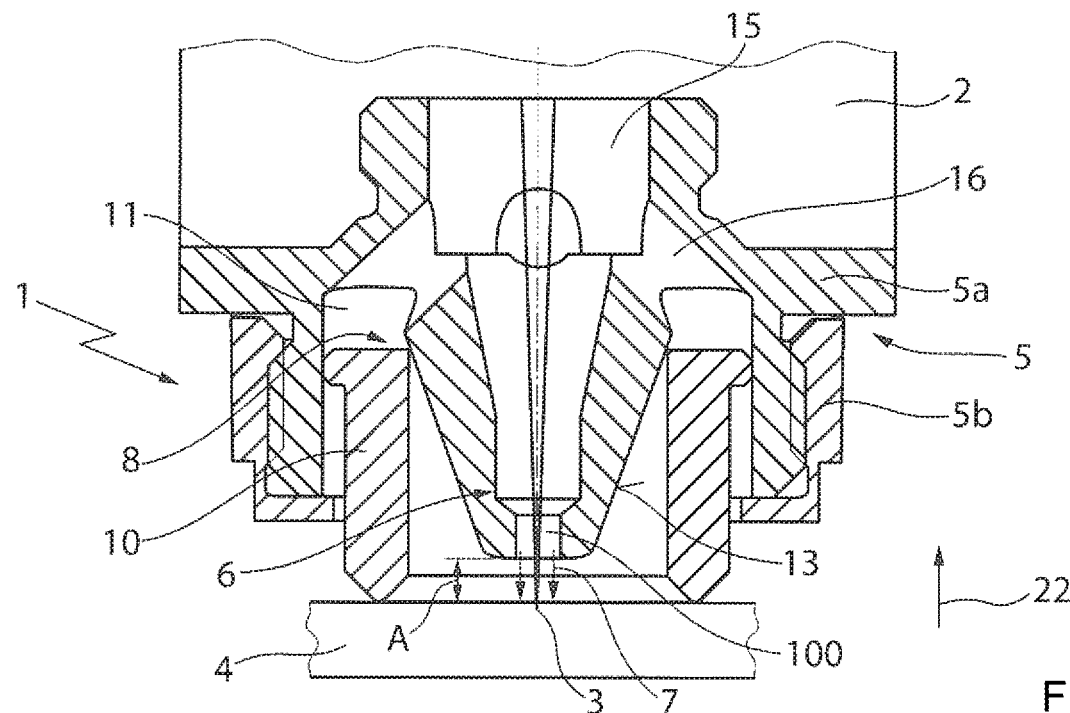
FIG. 1A shows a first cutting gas nozzle having an outer nozzle in a closed end position.

Identical reference signs are used for the same or functionally equivalent components in the following description of the drawings.

DETAILED DESCRIPTION

The cutting gas nozzles 1, 1' shown in FIGS. 1A, 1B, 2A, and 2B are disposed on a laser machining head 2 and direct a cutting gas onto a workpiece (for example a metal sheet) 4 machined by a laser beam 3.

The cutting gas nozzles 1, 1' in each case include one nozzle body 5 having an inner nozzle 6 for forming a core flow 7, and an outer nozzle 8 surrounding the inner nozzle 6 for forming an annular flow 9. A sleeve 10 (formed as a valve sleeve) projects beyond the inner nozzle 6 and is guided in the annular gap 11 of the outer nozzle 8 so as to be axially displaceable between two positions. In at least one position the sleeve 10 projects beyond the inner nozzle 6. The valve sleeve 10 can be a ceramic sleeve and closes the nozzle cross-sectional area 25 of the outer nozzle 8 in the one position, and opens (or widens) the nozzle cross-sectional area 25 of the outer nozzle 8 in the other position. The valve sleeve 10 is guided so as to be displaceable on the external wall 12 of the annular gap 11. A valve seat 14 that closes the outer nozzle 8 when the valve sleeve 10 in the end position is on the internal wall 13 of the annular gap 11, the internal wall 13 being formed by the external side of the inner nozzle 6. The inner nozzle 6 is connected to a gas supply (not shown) by way of the central nozzle bore 15. The annular gap 11 is connected to the nozzle bore 15 by way of one or a plurality of connection openings 16. The laser beam 3 is directed through the nozzle exit opening 100 of the inner nozzle 6 onto the workpiece 4.

The valve sleeve 10 has an externally encircling centering bead 17 with a tight tolerance, the centering bead 17 being guided so as to be displaceable on the external wall 12 of the annular gap 11 in a largely sealed manner. A mechanical clearance between the external wall 12 of the annular gap 11 and the outwardly pointed or spherical centering bead 17 enables tilting of the valve sleeve 10 by approximately ±5° within the annular gap 11. In this way, unevennesses in the workpiece surface can be accounted for in the movement of the valve sleeve 10 on the workpiece 4. To slide without damage across minor steps in the workpiece surface (for example, as can arise by the tilting of workpiece parts that have been cut off), the front end face of the valve sleeve 10 on the internal side and the external side has in each case one encircling run-up slant 18a, 18b in the form of a chamfer having a chamfer angle of 45° (e.g., between 30° and 60°).

Figure 1B:
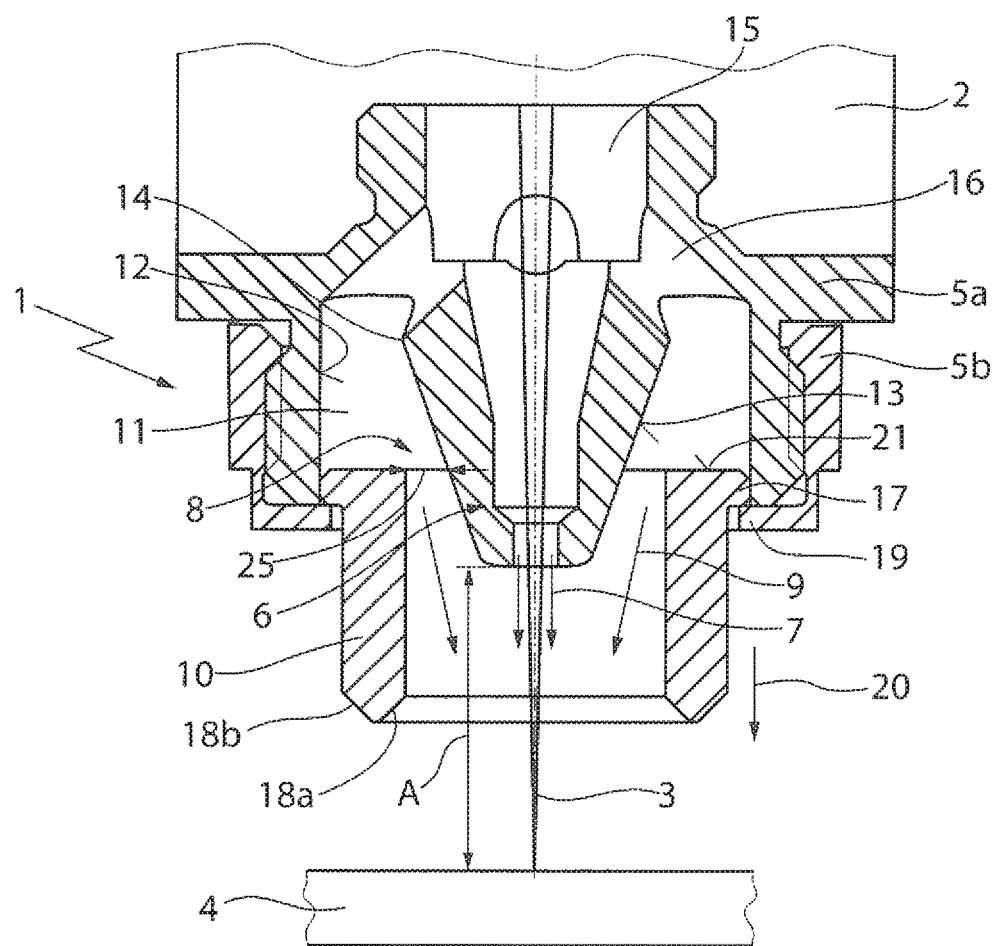
FIG. 1B shows a first cutting gas nozzle having an outer nozzle in an open end position.

In the case of the cutting gas nozzle 1 shown in FIGS. 1A and 1B, the nozzle body 5 comprises a main body 5a (for example made from copper) that is screw-fitted into the laser machining head 2 and that has the inner nozzle 6, that is optionally screw-fitted to the main body 5a or is integral to the latter. An outer nozzle 8, and a securing nut 5b (for example made from copper) is screw-fitted externally onto the main body 5a and has a securing rim 19 that projects radially inward into the annular gap 11. The securing rim 19 holds the valve sleeve 10 captive in the annular gap 11 and forms an end stop on which the valve sleeve 10 in the forward end position thereof bears by way of the centering bead 17. The valve seat 14 is formed by the internal wall 13 of the annular gap 11, the internal wall 13 converging in a conical manner in the forward direction 20 of the valve sleeve 10, the valve seat 14 conjointly with the valve sleeve 10 forming an annular gap valve.

In the rearward end position of the valve sleeve 10 (spacing A of the inner nozzle 6 from the workpiece 4 can be approximately 0 to 1 mm) as shown in FIG. 1A, the valve sleeve 10 sits on the workpiece 4 and by way of the internal edge of the sleeve bore of the valve sleeve 10 bears in a sealing manner on the valve seat 14, so that the annular gap valve and thus the nozzle cross-sectional area 25 of the outer nozzle 8 are closed. The cutting gas that flows into the cutting gas nozzle 1 from the laser machining head 2 can flow out as a core flow 7 only through the central nozzle exit opening 100 of the inner nozzle 6. This single-bore nozzle (single-duct nozzle) is desirable in the machining of a thin sheet, for example.

When the valve sleeve 10 is advanced from the rearward end position thereof toward the front, the valve sleeve 10 is lifted from the valve seat 14 and the annular gap valve opens. As the valve sleeve 10 advances, an increasingly wider gap, that is to say an increasingly wider nozzle opening 25, is created between the valve sleeve 10 and the internal wall 13 such that an increasing proportion of the cutting gas no longer flows out through the nozzle exit opening 100 of the inner nozzle 6 but by way of the connection openings 16 into the annular gap 11 and from there as an annular flow 9 through the outer nozzle 8. This bypass flow nozzle (multi-duct nozzle) in which the cutting gas flows out both from the inner nozzle 6 as well as from the outer nozzle 8 is desirable when cutting thick workpieces. The valve sleeve 10 is shown in its forward end position in FIG. 1B, wherein the spacing A of the inner nozzle 6 from the workpiece 4 is larger by at least the displacement path of the valve sleeve 10 between the two end positions thereof than that in the rearward end position.

Because of the centering bead 17, the rear end face 21 of the valve sleeve 10 is significantly larger than the front end face formed from the part-face 18a, such that the pressure difference between the interior of the nozzle and the environment causes the valve sleeve 10 to advance in the forward direction 20 and, in the case of a valve sleeve 10 that has already landed on the workpiece surface, a contact-pressure force of the valve sleeve 10 on the workpiece surface that is proportional to the cutting gas pressure. Any lifting of the valve sleeve 10 from the workpiece surface is positively prevented due to this pneumatic spring approach of the valve sleeve 10 that is proportional to pressure. The reversing of the valve sleeve 10 in the reverse direction 22 is performed by lowering the cutting gas nozzle 1 at a variable spacing from the workpiece 4 such that the valve sleeve 10 lands on the workpiece surface and is then reversed in the reverse direction 22.

Figure 2A:
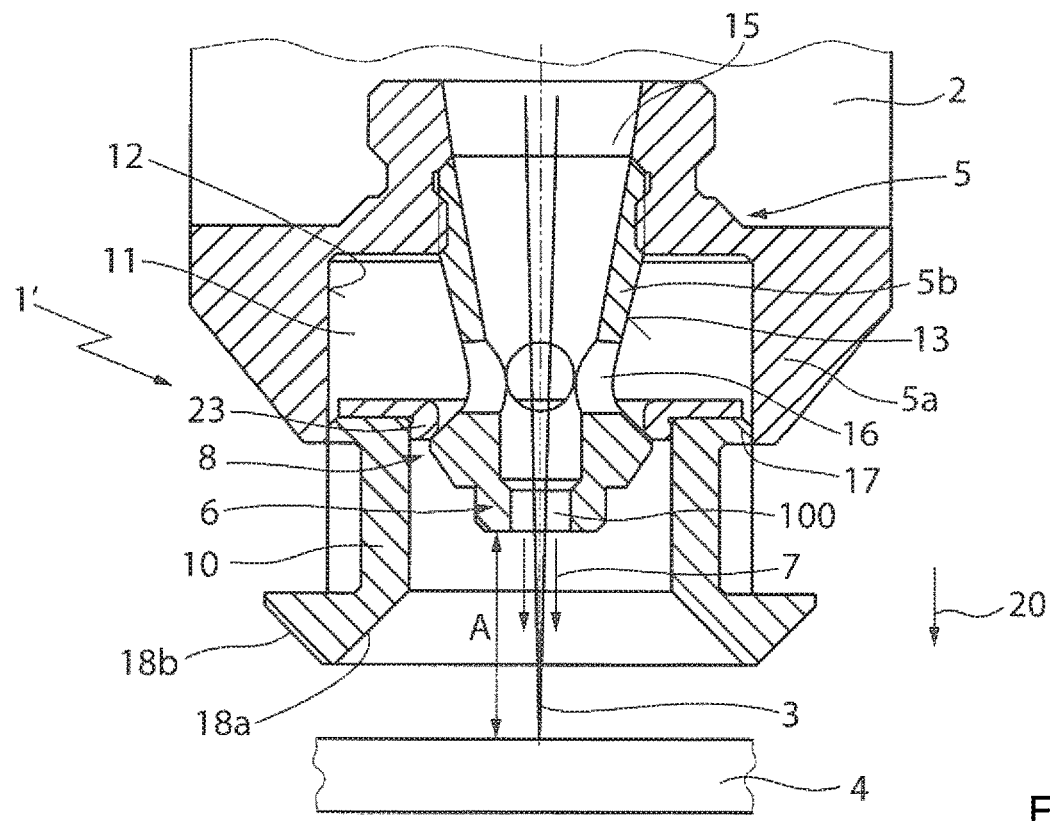
FIG. 2A shows a second cutting gas nozzle having an outer nozzle in a closed end position.
Figure 2B:
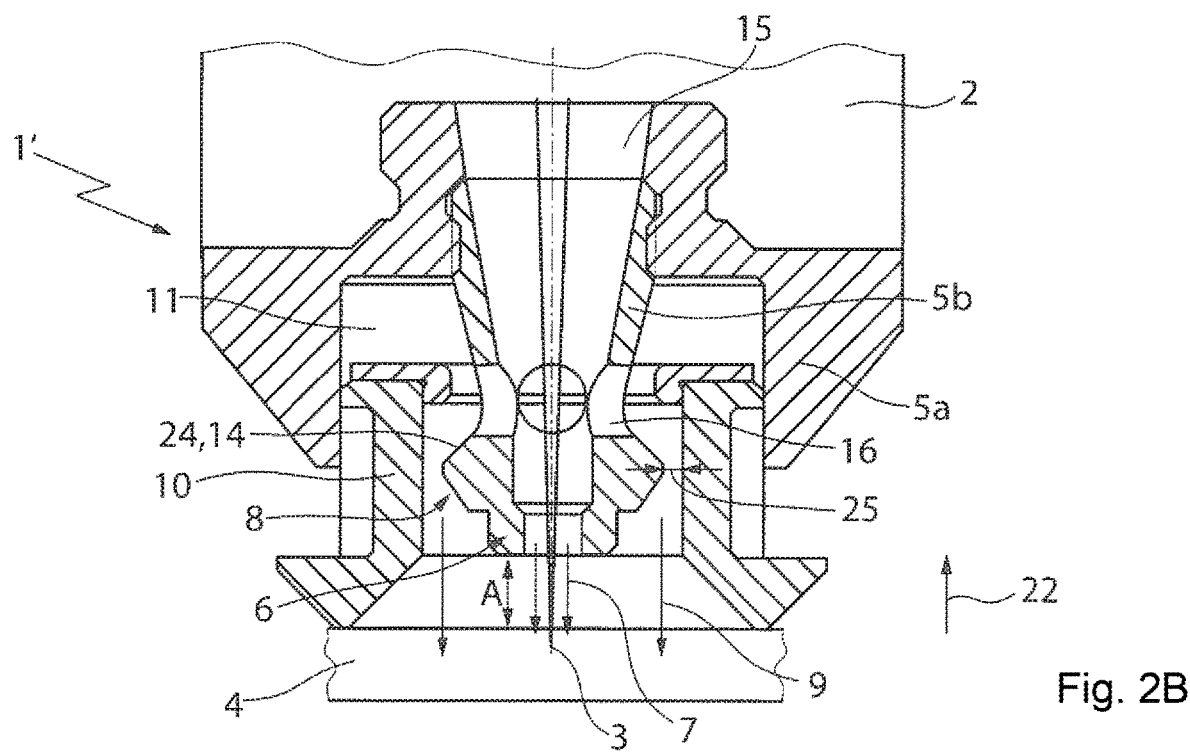
FIG. 2B shows a second cutting gas nozzle having an outer nozzle in an open position.

In the case of the cutting gas nozzle 1' shown in FIGS. 2A and 2B, the nozzle body 5 comprises an external nozzle body 5a (for example made from copper) that is screw-fittable into the laser machining head 2 and forms the external wall 12 of the annular gap 11. The nozzle body also has an inner nozzle body 5b (for example made from copper) that is screw-fitted, press-fitted, or adhesively bonded into the external nozzle body 5a and comprises the inner nozzle 6, the external side of the inner nozzle body 5b forming the internal wall 13 of the annular gap 11. The valve seat 14 is formed by a front wall portion 24 of the internal wall 13 that converges conically in the reverse direction 22 and interacts with an internal contour of the valve sleeve 10 that is shaped as a shoulder, or with an annular seal 23 which is fastened to the rear end side of the valve sleeve 10 and engages behind the valve seat 14 in the forward direction 20. The annular seal 23 or the shoulder of the valve sleeve 10, respectively, holds the valve sleeve 10 so as to be captive in the annular gap 11. The valve seat 14 conjointly with the valve sleeve 10 forms an annular gap valve.

In the forward end position of the valve sleeve 10 shown in FIG. 2A, the valve sleeve 10 is spaced apart from the workpiece 4 and by way of the annular seal 23 bears on the valve seat 14 in a sealing manner, so that the annular gap valve and thus the nozzle cross-sectional area 25 of the outer nozzle 8 are closed. The cutting gas that flows into the cutting gas nozzle 1' from the laser machining head 2 can flow out as a core flow 7 only through the central nozzle exit opening 100 of the inner nozzle 6. This single-bore nozzle (single-duct nozzle) is desirable in the piercing of the workpiece 4 by the laser beam 3 or in the machining of thin sheets, when the laser machining head 2 and thus the inner nozzle 6 are spaced apart from the workpiece surface at a large distance.

When the valve sleeve 10 is reversed from the forward end position thereof by lowering the machining head 2 in the direction of the workpiece surface 4 in the reverse direction 22 to the position shown in FIG. 2B, the valve sleeve 10 is lifted from the valve seat 14 and the annular gap valve opens such that the cutting gas by way of the connection openings 16 flows out also into the annular gap 11 and from there as an annular flow 9 through the nozzle cross-sectional area 25 of the outer nozzle 8. This bypass flow nozzle (multi-duct nozzle) in which the cutting gas flows out of both the nozzle exit opening 100 of the inner nozzle 6 as well as from the outer nozzle 8 is desirable for cutting thick workpieces. The valve sleeve 10 in FIG. 2B is shown bearing on the workpiece 4, wherein the spacing A of the inner nozzle 6 from the workpiece 4 is smaller by the displacement path of the valve sleeve 10 than in the forward end position of the nozzle when landed.

The valve sleeve 10 in the example shown is constructed such that in operation, independently of the absolute level of gas pressure, the lifting force and the contact-pressure force that act on the valve sleeve 10 by way of the cutting gas pressure are just at an equilibrium, such that the valve sleeve 10 slides across the (planar) workpiece surface largely without friction but nevertheless so as to bear thereon in a constantly planar manner. This is achieved in that that surface part of the valve sleeve 10 on which the cutting gas pressure acts in the forward direction 20 is equal in size to that surface part of the valve sleeve 10 on which the cutting gas pressure acts in the reverse direction 22. In the example shown, the rear end face that is formed by the valve sleeve 10 and the annular seal 23 is of equal size to the front end face (in the projection) that is formed by the internal run-up slant 18a, the front end face being impinged with cutting gas pressure in the case of the valve sleeve 10 having landed on the workpiece 4. Advancing the valve sleeve 10 in the forward direction 20 in the case of a valve sleeve 10 that has not landed on the workpiece 4 is performed by the cutting gas pressure. Reversing the valve sleeve 10 in the reverse direction 22 is performed by lowering the cutting gas nozzle 1 at a variable spacing from the workpiece 4, so that the valve sleeve 10 lands on the workpiece surface and is reversed in the reverse direction 22. A defined hovering state of the valve sleeve 10 above the workpiece 4 can be achieved independently from the current gas pressure by modifying these area ratios in a targeted manner, so as to enable scratch-free machining by cutting, for example.

Following piercing, deposits of slag and solidified metal droplets adhere to the workpiece surface. This contamination of the workpiece surface renders it unsuitable for landing the valve sleeve 10 in a flush manner on the workpiece 4, but still must be traversed on the path of the laser beam 3 from the piercing hole to the start of the actual cutting contour. The numerically controlled switching of the nozzle characteristic is beneficial in this transitional region (referred to as "precut") between the piercing position and the actual cutting contour. In the region of the precut, the nozzle characteristic of a single-bore nozzle (single-duct nozzle) is more favorable for a stable cutting process, while switching to the bypass flow (multi-duct) characteristic can take place upon reaching the actual component contour should this be more favorable for cutting thick workpieces.

The cutting gas nozzle 1' when piercing at a large spacing has the same properties as those of a classic single-bore nozzle (single-duct nozzle). Therefore, no additional data detection for piercing process parameters is required. The gas jet is compact when piercing, as the gas jet can exit only through the central opening 100 of the inner nozzle 6, thus the cutting gas nozzle 1' is protected against contamination by splashes or smoke. The trajectory and the cooling behavior of metal droplets that are ejected out of the piercing hole are influenced in the best possible manner such that piercing that is as splash-free as possible is achieved.

The almost gas-tight encapsulation of the region between the cutting gas nozzle 1, 1' and the workpiece surface in the case of a landed cutting gas nozzle 1, 1' has several advantages, including minimizing the quantity of gas that does not penetrate the cutting gap (utilized process gas), but flows out of the processing zone horizontally across the sheet surface (non-utilized process gas). Due to this minimization, the maximum cutting gas pressure provided by the machine, and the required maximum cutting gas flow rate, are also minimized, as is the noise emission generated by the cutting gas nozzle 1, 1'. Cutting of even larger sheet thicknesses is possible due to the improved coupling of the cutting gas into the cutting gap at available maximum gas pressures provided by the machine. Any detrimental mixing of the cutting gas (ultrapure oxygen, for example) with ambient air that is also suctioned into the cutting gap is prevented.

The "floating" tilting mounting of the valve sleeve 10 in the nozzle body 5 in the ongoing cutting operation permits the numerically controlled variation of the spacing A between the nozzle and the sheet, and on account thereof the targeted modification of the flow distribution within the valve sleeve 10 and the flexible employment of the cutting gas nozzle 1, 1' both as a classic single-bore nozzle (single-duct nozzle) as well as a consumption-minimized bypass flow nozzle (multi-duct nozzle). Also, non-planar workpiece surfaces are automatically compensated for without modifying the cutting gas dynamics and thus also without modifying the cutting result.

The valve seat 14, as opposed to the shown conical variant, can also be a planar annular shoulder, in particular on the base of the annular gap 11.

Figure 3A:
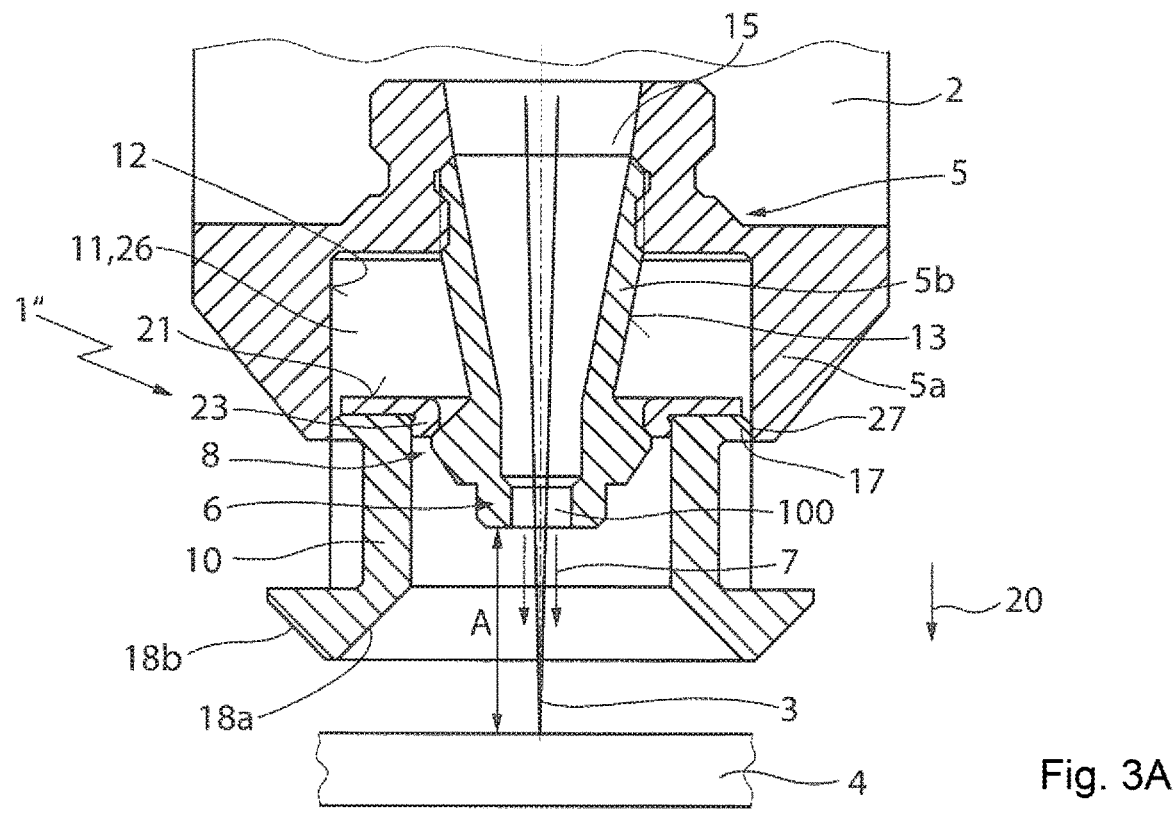
FIG. 3A shows a third cutting gas nozzle having an outer nozzle in a closed end position.
Figure 3B:
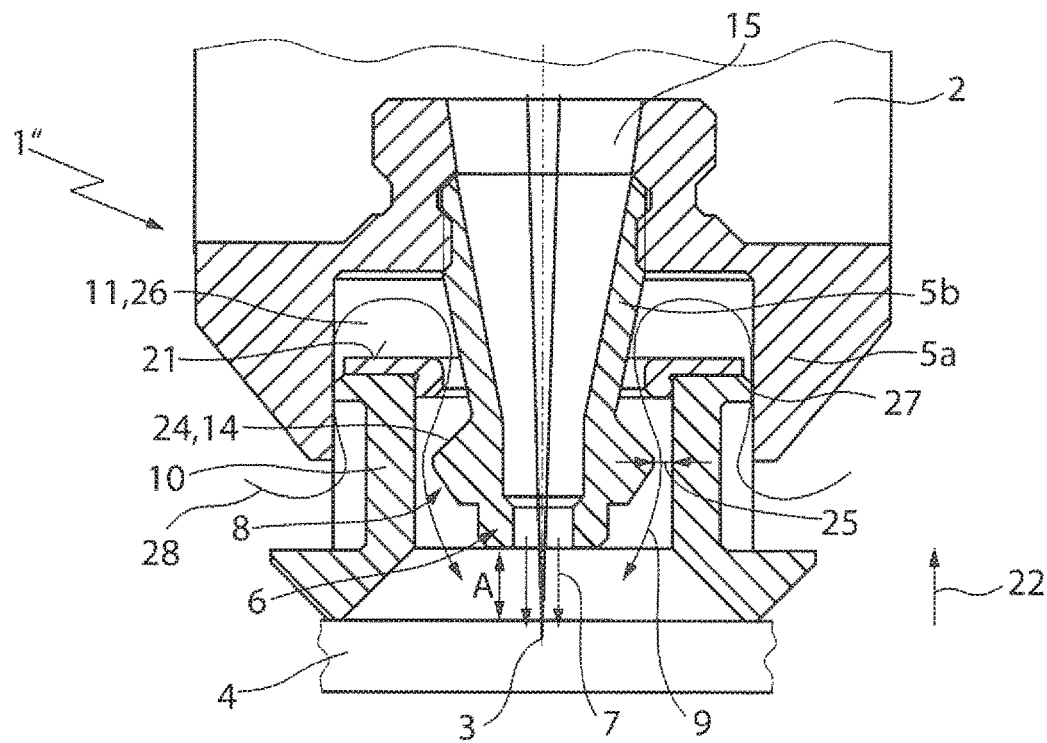
FIG. 3B shows a third cutting gas nozzle having an outer nozzle in an open position.

The cutting gas nozzle 1" shown in FIGS. 3A and 3B differs from the cutting gas nozzle 1' of FIGS. 2A and 2B in that the nozzle bore 15 of the inner nozzle 6 and the annular gap 11 of the outer nozzle 8 are not interconnected and thus there are no connection bores. An annular space 26 is provided between the rear end face 21 of the valve sleeve 10 and the nozzle body 5 is connected to the environment by way of a guide gap 27 that is provided between the nozzle body 5 and the valve sleeve 10. Thus, the sealing of the external diameter of the valve sleeve 10, or of the centering bead 17 thereof, respectively, in relation to the ambient atmosphere as desired in the case of the cutting gas nozzles 1, 1' is dispensed with in a targeted manner.

The ratio between the rear and the front end faces of the sleeve is chosen such that, independently of the cutting gas pressure used, the gas pressure forces that in the cutting operation act on the valve sleeve 10 cause a defined hovering state of the valve sleeve 10 such that a sufficiently high flow of lost gas escapes from the valve sleeve 10 through the gap between the front end face of the sleeve and the workpiece surface, the gap being adjustable in a defined and reproducible manner.

Alternatively, a sufficiently high flow of lost gas can also be achieved by the targeted incorporation of gas outflow ducts into the end face of the sleeve, or else of gas outflow bores into the cylindrical part of the sleeve.

If the cutting gas nozzle 1", proceeding from the closed valve position thereof that is shown in FIG. 3A, is operated at an increasingly reduced spacing A of the inner nozzle to the workpiece 4, the valve sleeve 10 is lifted from the valve seat 14 and the annular gap valve is increasingly opened (FIG. 3B). Due to the Venturi effect of the cutting gas that flows out of the inner nozzle 6, (increasingly more) air (and thus oxygen) 28 is suctioned by way of the guide gap 27 as an annular flow 9 from the environment, the annular flow within the valve sleeve 10 mixing with the nitrogen cutting gas jet. In this way, depending on the spacing A of the inner nozzle from the workpiece 4, a proportion of foreign gas in the nitrogen flow that is utilized as the cutting gas can be adjusted in a targeted manner by way of oxygen from the environment. The cutting gas nozzle 1" thus acts as an adjustable gas-mixing nozzle. Adapting the resulting proportion of oxygen in the cutting gas to the requirements of the current cutting process can be performed in a reproducible and adjustable manner (depending on, for example, the laser output, the sheet thickness, the rolling skin surface properties) by way of the correct choice of the spacing A of the inner nozzle from the workpiece 4.

With the aid of such an adjustable gas-mixing nozzle the process efficiency and process stability, for example in the cutting of aluminum by $CO_2$ laser radiation, can be increased by controlled admixing of approximately 0.5 to 2% oxygen from the environment to the ultrapure nitrogen cutting gas jet. Due to the presence of the minor percentage of oxygen, an increase in the absorption coefficient and a reduction in the melt viscosity are achieved in the cutting process.

If admixing of ambient air is not to be performed, the spacing A of the inner nozzle from the workpiece 4 is to be enlarged to the extent that the valve sleeve 10 lands on the conical valve seat 14 and the annular gap 11 is thus closed (FIG. 3A). In this way, coupling-in of the ultrapure cutting gas jet into the cutting gap is enabled at a minimal contamination by the ambient atmosphere. This is advantageous for cutting oxide-free components, for example.

In a further variant (not shown), the gas nozzle can alternatively be embodied such that the nozzle bore 15 of the inner nozzle 6 and the annular gap 11 of the outer nozzle 8 are not interconnected, thus that no connection bores are provided, and such that the annular space 26 that is provided between the rear end face 21 of the valve sleeve 10 and the nozzle body 5 is not connected to the environment. The gas nozzle in this variant always acts as a single-duct nozzle. A variation of the flow conditions is not possible by way of such a gas nozzle, but coupling-in of the cutting gas into the cutting gap, or the effect of an inert gas in welding is improved, respectively.

Figure 4A:
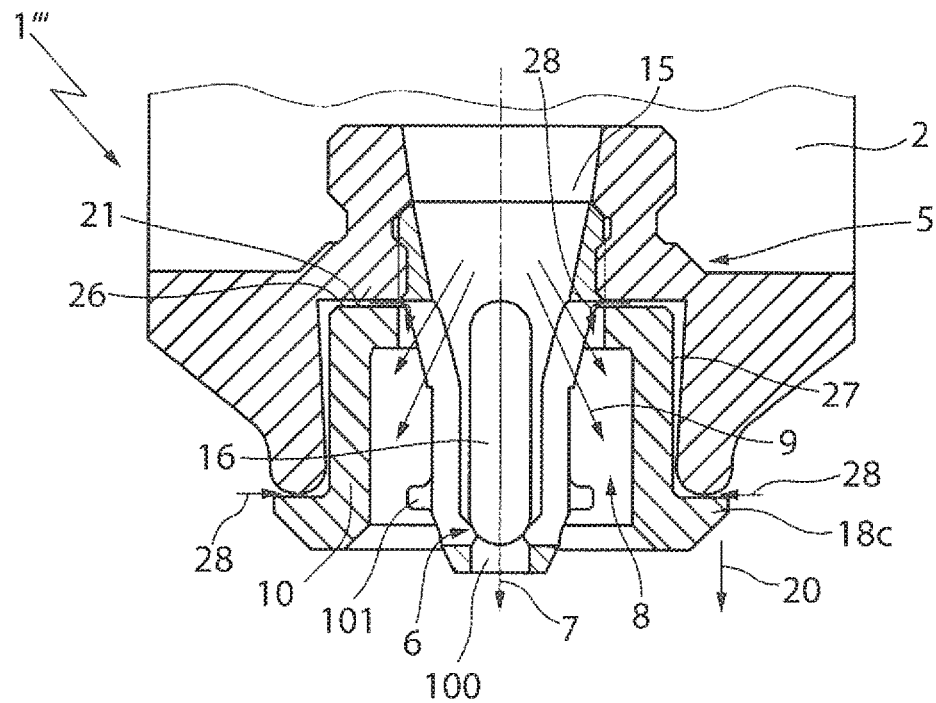
FIG. 4A shows a fourth cutting gas nozzle having an outer nozzle in one end position
Figure 4B:
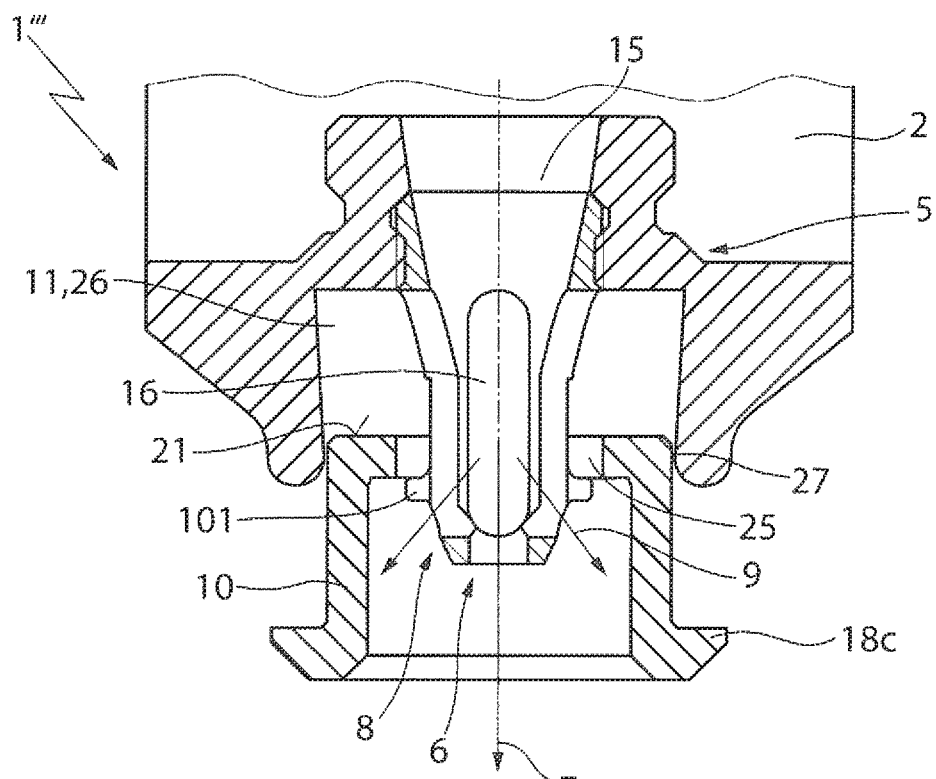
FIG. 4B shows a fourth cutting gas nozzle having an outer nozzle in another end position.

The cutting gas nozzle 1''' shown in FIGS. 4A, 4B differs from the cutting gas nozzle 1' of FIGS. 2A and 2B in that the connection openings 16 are formed as axial oblong holes which interconnect the nozzle bore 15 of the inner nozzle 6 and the annular gap 11 of the outer nozzle 8 in the rearward end position (FIG. 4A) up to the forward end position (FIG. 4B) of the sleeve 10, and in that an annular space 26 which is connected to the environment by way of a guide gap 27 that is provided between the nozzle body 5 and the sleeve 10 remains in the rearward end position of the sleeve 10 between the rear end face 21 of the sleeve 10 and the nozzle body 5. Due to the connection bores 16 and to the annular space 26 that is provided in each sleeve position, by way of a targeted choice of the gas pressure it is possible for the sleeve 10 to be suctioned in the reverse direction 22 from an advanced position up to the rearward end position of the sleeve 10. The rearward end position of the sleeve 10 is defined either by the rear end face of the sleeve bearing on the conical external side of the inner nozzle 6, or by the front sleeve rim 18c bearing on the nozzle body 5.

As opposed to the cutting gas nozzles 1, 1', 1'', the sleeve 10 of the cutting gas nozzle 1''' does not have any outwardly pointed or spherical centering bead; rather, the external wall 12 of the annular gap 11, formed by the internal wall of the main body 5a of the nozzle body 5, here tapers conically in the forward direction 20, so as to enable tilting of the sleeve 10 by approximately ±5° within the annular gap 11. Alternatively or additionally, the sleeve wall on the external side can also taper, in particular in a conical manner, in the reverse direction 22.

When the cutting gas flow is switched on, negative pressure is first generated in the annular space 26 of the cutting gas nozzle 1''', or on the rear end face 21 of the sleeve 10, respectively. This negative pressure draws the sleeve 10 into the nozzle body 5 up to the rearward end position even when the sleeve 10 is not in contact with the workpiece surface. If the gas pressure of the cutting gas remains lower than a limit pressure (for example 3 bar) that is predefined by the weight of the sleeve 10, the sleeve 10 remains in the suctioned state. This state is utilizable for protecting the sleeve 10 from damage or contamination, for example, when piercing, when employing the nozzle for engraving or marking the workpiece, or when cleaning the nozzle with brushes. That is to say in methods that operate at a large nozzle spacing from the workpiece 4 the sleeve 10 nevertheless remains in the rearward end position in the nozzle body 5.

If the gas pressure is increased beyond the limit pressure, the cutting gas flows through the annular gap 8 between the inner nozzle 6 and the sleeve 10 in an increasingly turbulent manner. The effect of force of the cutting gas that is directed forward likewise increases such that the sleeve 10 is urged in the forward direction 20 by the cutting gas. This state when cutting the workpiece 4 is adjusted such that the sleeve 10 is in contact with the workpiece surface. This effectively prevents any lateral outflow of the cutting gas and suctioning of ambient air into the cutting gap. In this way, the gas consumption is reduced and a precisely defined gas composition is obtained in the cutting gap, significantly improving the quality of the cut edges obtained.

To suction the sleeve 10 again after the cutting operation, the gas pressure at the entry 15 of the nozzle body 5 first is reduced to almost 0 bar, or completely switched off. Increasing the gas pressure to just below the limit value again then has the effect of suctioning the sleeve 10, which by virtue of gravity is located in the forward end position thereof on protrusions 101 of the nozzle body 5, to the rearward end position thereof. In the case of a constant gas pressure at below the limit pressure, the sleeve 10 remains in the rearward end position thereof in the nozzle body 5.

Instead of by way of the guide gap 27 as shown in FIGS. 3A to 4B, air from the environment can also be suctioned by way of a bore (not shown) in the nozzle body 5, the bore connecting the annular space 26 to the environment.

Figure 5A:
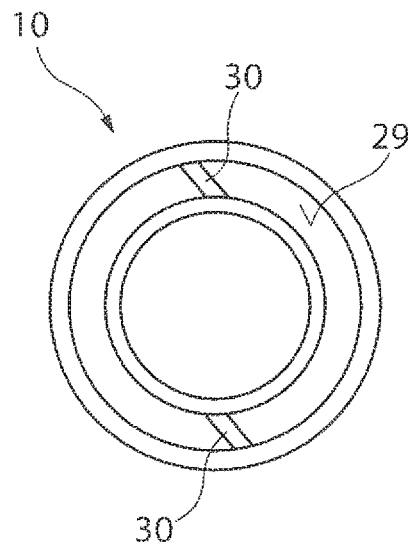
FIG. 5A shows a modifications to the sleeves of FIGS. 1A to 4B, in a plan view of the front end side of the sleeve.
Figure 5B:
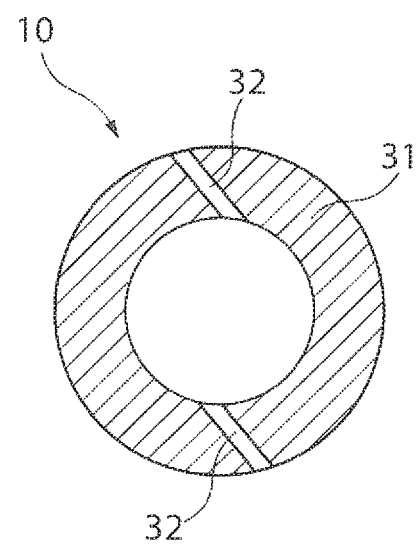
FIGS. 5B and 5D show modifications to the sleeves of FIGS. 1A to 4B in a cross-sectional view.
Figure 5C:
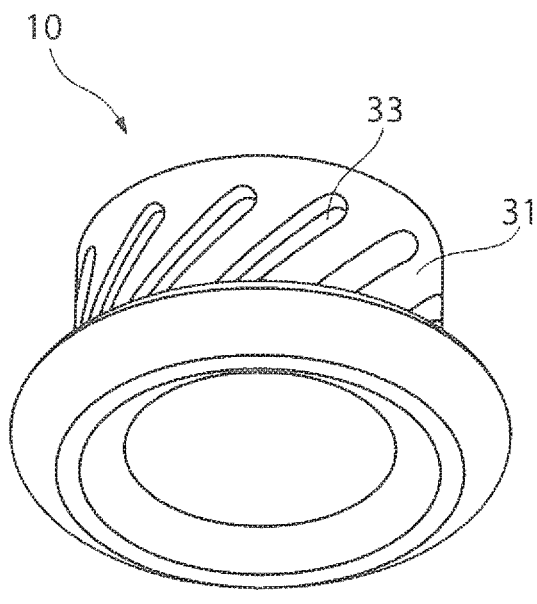
FIG. 5C shows a modification to the sleeves of FIGS. 1A to 4B in a perspective side view.
Figure 5D:
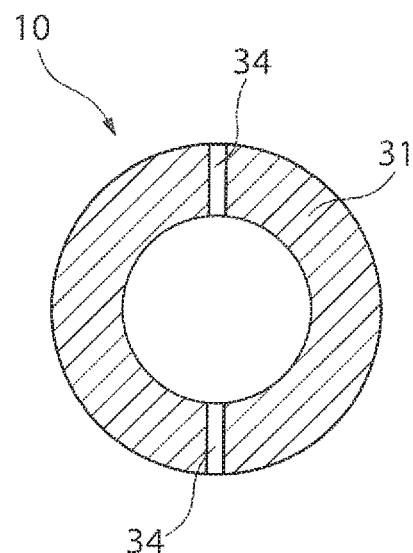

Various modifications to the sleeve 10 are shown in FIGS. 5A to 5D. In FIG. 5A, the front end face 29 of the sleeve 10 has a plurality of grooves 30 that run obliquely to the radial direction or helically, with two grooves illustrated. In FIG. 5B, the cylindrical sleeve wall 31 has a plurality of bores 32 that run obliquely to the radial direction, with two bores illustrated. In both cases the sleeve 10 is set in rotation by the cutting gas in the grooves 30 or bores 32 that flows out from the inside to the outside. The grooves 30 can be very narrow and flat such that only a minor fraction of the cutting gas flows out to the environment through the grooves 30. Due to the oblique or helical alignment of the grooves 30 and of the bores 32, the momentum of the outflowing cutting gas exerts a torque on the valve sleeve 10 and sets the latter rotation. Alternatively, a plurality of grooves 33 (FIG. 5C) that run obliquely to the axial direction can also be provided on the external side of the cylindrical sleeve wall 31, such that the valve sleeve 10 is set in rotation by the air 28 or the process or inert gas that flows axially in the guide gap 27. In addition to the rotation-causing structures, the valve sleeve 10 in the cylindrical sleeve wall 31 thereof can have one or more thin bores 34 (FIG. 5D).

The rotation of the sleeve 10 can have several advantages. When the sleeve 10 is made from a highly abrasion-resistant material, such as, for example, oxide ceramics ($Al_2O_3$), the sleeve 10 can to a certain extent remove contaminants from the workpiece surface by way of a momentum transfer due to the front end face 29. For example, for a turning tool or a milling tool. When the sleeve 10 is in mechanical contact with the workpiece surface and is rotating, planar contaminants such as, for example, oil or mill scale layers, paint or adhesive residues, pulverulent traces, metal pearls, or the like, can be removed. However, the ceramics sleeve 10 can leave behind scratch marks on the workpiece surface due to the direct mechanical contact. Moreover, due to the rotation of the sleeve 10, the static friction between the sleeve 10 and the workpiece surface, and the wear of the sleeve 10, are reduced due to localized heating.

If the sleeve 10 has geometric structures such as, for example, grooves 30, on its end face 29 (FIG. 5A), or bores 32, 34 in the sleeve wall 31 (FIGS. 5B and 5D) through which a minor part of the process gas in a locally delimited manner can flow out from the interior space of the sleeve 10 into the environment, the rotation of the sleeve 10 enables a targeted modulation of the process gas pressure in the processing zone (on the workpiece 4) that is located below the sleeve 10. The pressure variations that are generated in a targeted manner have a positive effect on the quality of the cut edges produced on the workpiece 4, for example, when laser cutting.

The sleeve 10 can also be made from plastics instead of ceramics, the plastics not having to be as temperature-resistant as ceramics. The better dynamic sliding properties of plastics have the advantage that the formation of scratches on the workpiece surface can be reduced or entirely eliminated in the movement of the sleeve 10 across the workpiece.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A cutting gas nozzle for a laser machining head, the cutting gas nozzle comprising:
    an inner nozzle comprising a nozzle opening configured to form a core gas flow during processing; and
    an annular gap surrounding the nozzle opening and configured to form an annular gas flow that first flows through the annular gap and then exits the cutting gas nozzle in an annular exit flow between the inner nozzle and a sleeve in the annular gap during processing;
    wherein the sleeve is arranged to be axially displaceable between a rearward position and a forward position,
    wherein the sleeve projects beyond the inner nozzle at least when in the forward position, and wherein the sleeve opens a cross-sectional area of the annular gap to a variable degree as the sleeve is displaced from the rearward to the forward position.

2. The cutting gas nozzle of claim 1, wherein the sleeve in the rearward position closes or mostly closes the annular gap and in the forward position opens the annular gap, or vice versa.

3. The cutting gas nozzle of claim 1, further comprising:
    a nozzle body that comprises the inner nozzle and the annular gap;
    a nozzle bore that forms the nozzle opening; and
    at least one connection opening connecting the nozzle bore and the annular gap.

4. The cutting gas nozzle of claim 3, wherein in the rearward position of the sleeve, an annular space that is connected to the environment by way of a gap between the nozzle body and the sleeve remains between a rear end face of the sleeve and the nozzle body, and wherein the at least one connection opening extends into the annular space.

5. The cutting gas nozzle of claim 1, wherein a surface part of the sleeve on which a cutting gas pressure acts in a forward direction is larger than a surface part of the sleeve on which the cutting gas pressure acts in a reverse direction.

6. The cutting gas nozzle of claim 1, wherein an internal wall of the annular gap is formed by the external side of the inner nozzle.

7. The cutting gas nozzle of claim 1, wherein the sleeve is guided so as to be displaceable on an external wall of the annular gap.

8. The cutting gas nozzle of claim 1, wherein the sleeve is mounted so as to be tiltable in the annular gap.

9. The cutting gas nozzle of claim 1, wherein the sleeve has a front end face with a run-up slant on the internal and/or external side.

10. The cutting gas nozzle of claim 1, wherein the sleeve is formed from a ceramic material or from a comparably temperature-resistant and electrically non-conducting material or from a plastic material that is temperature resistant up to at least 100° C.

* * * * *